United States Patent Office
3,528,809
Patented Sept. 15, 1970

3,528,809
HOLLOW ARTICLE PRODUCTION
Joseph Redmond Farnand and Ira Edwin Puddington, Ottawa, Ontario, Canada, assignors to Canadian Patents and Developments Limited, Ottawa, Ontario, Canada, a corporation of Canada
No Drawing. Filed Apr. 7, 1966, Ser. No. 540,807
Claims priority, application Canada, Apr. 15, 1965, 928,412
Int. Cl. C22b
U.S. Cl. 75—222                    12 Claims

ABSTRACT OF THE DISCLOSURE

Preparation of hollow articles especially very small spheres from particulate metals, metal compounds which are easily reduced to metal or sinterable and silica by forming a shaped core of a material transformable directly into gas, coating this core with the discrete particles, if necessary with a binder, initiating transformation of the core into gas, slowly removing the core material through the particulate coating in gaseous form at low internal pressures, and consolidating the coating to strengthen the hollow article.

---

This invention is directed to the production of hollow articles, particularly small metallic spheres. A process has been developed in which a powder coating is built up on a core and the core material slowly removed through the coating without damaging it.

Hollow articles have been previously made by applying metal to a core by vapour deposition, electroplating and chemical plating. The cores were removed by dissolving or leaching with solvent, burning and removing combustion gases and melting and removing as liquid (suitable for thick, strong, highly porous coatings only). With dissolving or solvent leaching there is a tendency for the core to swell and damage the coating, or for the thin coating to collapse when the solvent is finally removed. Detrimental surface tension effects occur when a liquid phase is involved. In some case it is necessary to leave an opening specifically for core removal. When combustion or high temperature decomposition is used it is difficult to avoid perforating or rupturing the coating particularly with small articles due to the pressures involved.

According to the present invention core material which is sublimable or depolymerizes to a vapour (without first melting to a liquid) is coated with a layer of finely divided flake or powder and the core material removed slowly as vapour (avoiding high pressures) through tiny pores in the coating. It is important that the core material not be removed quickly to avoid damage to the coating. Usually it is not desirable to accelerate the core removal to less than about 0.5 hour.

Hollow articles of varying size can be made according to the invention. The process is not usually economical with articles larger than about one inch. The process is mainly advantageous in preparing hollow articles less than about 0.2 inch across and of wall thickness less than 0.01 inch. This invention is particularly concerned with hollow microspheres of metals such as aluminum, beryllium, boron or magnesium. Coatings of these metals cannot be satisfactorily prepared by chemical reduction of their salts in solution. Spheres in the range 0.005 to 0.060 inch in diameter with a wall thickness of about 1 to $5 \times 10^{-6}$ inches are of particular interest. Bulk density is desirably from about 0.01 to about 0.1 gm./cc. Spheres of these sizes can be produced according to the present invention.

The metal or other material is prepared in flake or powder form by any suitable method. Metal powders can be converted to pigment flakes by ball milling (e.g. with polished steel balls in an organic solvent). Very suitable flakes of aluminum, zinc, copper, silver or magnesium about $1 \times 10^{-5}$ inches thick can be prepared in this or a similar manner. While thin coatings require flakes as a starting material, thicker coatings will tolerate regular shaped particles. Powder may be prepared by grinding bulk material, if it is sufficiently brittle, aspirating the molten material as a liquid spray, or flame spraying the solid into a collecting device. Other metals which may be used include nickel, lead, indium and tin. However, virtually any finely divided solid may be used to form the coating providing its melting point is well above the core removal temperature. Suitable solids include titanium carbide, tungsten carbide, alumina and silica. Preferably the particle size range is 0.1 to 40 microns.

Core materials which have been found suitable are naphthalene, anthracene, camphor, polyaldehydes (e.g. solid polyformaldehydes, paraformaldehyde) and ammonium salts such as ammonium tetramethyl bromide, iodide or hydroxide-monohydrate, ammonium phenyltrimethyl chloride, ammonium chloride and ammonium carbonate. The latter salts can be molded by pressing or spherical agglomeration for instance. In general any material which decomposes or sublimes directly to gaseous form with pressure sufficient to escape through the metal coating (but insufficient to damage the coating) and which can be formed into the desired spheres or other core shape, may be used. Naphthalene was found to be the most satisfactory core material in most cases, since it has a melting point lower than boiling water, a higher density than water and little solubility for it (easy core formation), and a suitably high sublimation pressure at room temperature.

Core spheres can be formed by preparing liquid emulsions of core material in non-solvents (at temperatures above the melting point). The emulsion droplets can be converted to solid spheres by cooling. The appropriate sieve size can be separated and the off-sizes may be reworked. For instance naphthalene forms spherical droplets if agitated in water at about 80° C. Other methods may be used to form the core shape, e.g., pressing, molding, machining.

The core balls can be coated uniformly with the appropriate amount of finely divided powder, pigment, or flake material, by a tumbling operation. However, other coating techniques can be used such as spraying, fluidized bed coating, etc. Some way of causing the powder or metal flakes to adhere to each other (or to cohere) must be provided or the coatings will collapse after core sublimation like a house of cards. One technique which has been found for accomplishing this is to incorporate a drying oil (e.g. boiled linseed, tung, or dehydrated castor oil) in the core material before shaping the core. As the core sublimes the oil has been found to remain with the coating and resinify. Alternatively, the drying oil may be applied directly to the powder or metal flakes or to the coating before or after forming the coating. A suitable amount of drying oil is from about 10 to about 50% by weight of the powder or metal flake. Oxidation of the drying oil to bond the flakes can be accelerated, if desired, by the use of catalysts or elevated temperatures as is known in the art. Time must be allowed for the drying oil to resinify in the coating before complete core removal.

Other binders which may be used are for instance synthetic resins or adhesives in solvents (e.g. epoxy resins, cellulose acetates). The nature of the binder or adhesive is not critical providing it acts to bind the particles and allows the core material to escape. Some finely divided solids may not require adhesive, if the coating has sufficient "green" strength.

Core materials such as naphthalene, camphor and paraformaldehyde will usually completely sublime or pass in gaseous form through the coating in about one to three days at room temperature. This time can be reduced to a few hours in a hard vacuum at room temperature. Elevated temperatures can also be used to accelerate core removal.

The resulting hollow spheres may be further treated to remove the binder, sinter the particles or modify the powder material (such as to convert the metal to the oxide, carbide or other compound). For example, hollow spheres of aluminum flake bonded with linseed oil were ignited in a muffle furnace for 15 to 45 minutes at 450 to 550° C. without altering their bright surface. This operation removed the organic matter and left unshrunken sintered hollow spheres of good strength. Ignition of these spheres at temperatures higher than the melting point of aluminum in an oxygen-containing atmosphere converted the shells rapidly into aluminum oxide with no significant change in shape or strength. In this case shaped oxide structures were produced at temperatures much lower than the usual sintering temperatures of aluminum oxide. If the hollow aluminum metal spheres are heated carefully, the melting point of the metal can be exceeded without the spheres collapsing presumably owing to the oxide layer that forms on the surface. If the atmosphere contains oxygen, the shell is converted to oxide quite rapidly.

In general, hollow spheres of metal compounds may be made by preforming hollow spheres of the metal and reacting to form the compound. The reverse is also possible, i.e., preforming metal compound powder into hollow spheres and reducing to form the metal. Layers of different powders can be applied successively to the core according to the present invention.

The resulting hollow spheres or shells may be used for thermal insulation, bulking of liquids such as hydrocarbons, nitrogen (liquified) and the like, and lightweight fillers in plastics.

The following examples illustrate the invention.

EXAMPLE 1

Ten grams of naphthalene, 0.2 gram of raw linseed oil and 100 grams of water were heated to about 90° C. (above the melting point of naphthalene). A small amount of soap was added to said emulsion formation. The mixture was then shaken to emulsify the molten naphthalene which formed a single liquid phase with the linseed oil. The emulsified mixture containing discrete droplets was poured rapidly into a large excess of cold water causing spherical droplets to solidify. These solid particles of naphthalene containing the drying oil were sieved and the −14 +16 mesh fraction recovered (5 gms.). The small spheres were dried (using blotting paper or mild air currents) and then added to a rotating jar containing 0.2 gram of aluminum flake pigment. A slight excess of pigment was used in the jar over the amount calculated to give a coating of the required thickness. The jar was rotated for about 10 minutes and the resulting coated spheres recovered. The coating was about $10^{-4}$ in. thick. The spheres were spread on a tray and the naphthalene sublimed under a slight vacuum at room temperature over a 24 hour period. The resulting hollow spheres could be handled without damage and had a bulk density of about 0.06 gm./cc. The final wall thickness was about $10^{-4}$ in.

Surprisingly the hollow aluminum spheres remained bright and shiny after several hours at 450° C. in an air oven. When heated to 700–800° C. the spherical shapes were retained, but the metal oxidized giving a dull gray hollow alumina sphere.

EXAMPLE 2

The procedure of Example 1 was followed using three grams of naphthalene (containing 0.04 gram linseed oil) of sphere size −20 +35 mesh (−0.0328+0.0164 inch). The spheres were coated with 0.4 gram of aluminum pigment and the naphthalene sublimed at room temperature over a 48 hour period.

EXAMPLE 3

Similar to Example 2 with the naphthalene cores being coated with linseed oil prior to coating with the aluminum.

EXAMPLE 4

Similar to Example 2, but the naphthalene was sublimed at 40° C. for 24 hours.

EXAMPLE 5

Similar to Example 2 with the drying of the oil and subliming of the core shortened to 3 hours by placing the charge about 2 feet from a 140 watt UV lamp.

EXAMPLE 6

Similar to Example 2 with tung oil containing 0.05% lead naphthenate replacing the linseed oil.

EXAMPLE 7

Similar to Example 2 with magnesium metal flakes replacing the aluminum.

EXAMPLE 8

Similar to Example 2 with an additional 5% linseed oil (based on the weight of the metal) being used.

EXAMPLE 9

Similar to Example 2, but the drying oil was omitted from the core. Instead 10% of linseed oil was dispersed in the aluminum pigment before application to the core and the rolling time in the jar was increased to 30 minutes.

EXAMPLE 10

Similar to Example 9 with naphthalene balls being coated with 10% (based on the weight of aluminum) of linseed oil prior to coating with the metal flake.

EXAMPLE 11

Similar to Example 10 with the linseed oil being applied as a solution in pentane.

Hollow spheres sufficiently rigid to be handled and poured from one container to another were obtained in each case (Examples 2 to 11). If pressed with a sharp object like a pin the sphere crumpled to a wrinkled mass but showed good tear resistance. When larger quantities of linseed oil were used the sphere behaved more like a heavily pigmented resin structure which could be distorted and would then spring back into shape rather than retaining the crumpled structure.

When the organic matter was removed by oxidation and the metal bonded by sintering, the completely metallic spheres were stronger than when bonded with the smaller quantities of dried oil (before sintering). No substantial difference in the final product was noted with the variations in the procedure that have been described above.

While the most convenient way of adding the binder was probably to have it dissolved in the naphthalene core as a carrier, it was quite possible to atomize both drying oils, and resins dissolved in volatile solvents, into the tumbling coated spheres. This operation had to be conducted carefully to avoid aggregating the small spheres.

The coatings of aluminum pigment had no strength and crumbled to a powder on sublimation of the core material when the binder was omitted. Similarly if the naphthalene were sublimed before the drying oil had a chance to bind the pigment, e.g., under low pressure within an hour or so after coating the spheres, the structure had little strength. While it might be possible to form a thick coating of sufficient strength this was not accomplished with coatings of the order of 0.001 inch thick or less.

EXAMPLE 12

Two grams of −20 +35 mesh naphthalene balls were coated with 0.26 gram of aluminum powder (by rolling in a jar mill) and further coated with 0.26 gram epoxy resin in a volatile liquid carrier by spraying. The core removal was relatively slower using this epoxy resin binder.

EXAMPLE 13

Five grams of −20 +35 mesh paraformaldehyde spheres were coated with 0.7 gram of aluminum powder, and further coated by spraying slowly with 1 cc. of 4% linseed oil alcoholic solution. Sublimation was carried out at 40° C. for 16 hours. The resulting hollow spheres retained their original shape and could be handled without damage.

EXAMPLE 14

Several experiments were tried where the pigment was tumble coated on small polystyrene spheres. While the coating adhered well to the polystyrene, and continued tumbling appeared to cause some cold welding of adjacent aluminum platelets, the whole structure disintegrated badly when the coated beads were placed in a solvent for polystyrene.

EXAMPLE 15

It has been found possible to coat naphthalene particles with coatings of finely divided tungsten- and titanium carbides, and alumina. The resulting non-metal shells weer sufficiently strong to maintain their shape if handled gently following slow sublimation of the core material. While no binder was used, the shells were relatively thick and could be sintered.

It is possible to form shells of easily reduced metal compounds that can be obtained in a finely divided form, e.g., copper oxide. These could be used with an organic binder if thin films were required or possibly without binder if thicker shells were acceptable. The copper oxide is readily reduced to metallic copper (following sublimation of the core material) using hydrogen at elevated temperatures.

It has been found possible to form thin hollow metal articles by using a core which decomposes (or is combustible) at temperatures at which the metal powder sinters. In this way the use of a drying oil or binder can be avoided and a sintered hollow sphere obtained directly. A suitable core was obtained by agglomerating carbon particles and removed by heating in an oxygen-containing atmosphere.

We claim:

1. A process for preparing hollow articles from finely divided particles of metal, metal compounds which are easily reduced to metal or sinterable and silica stable at the core removal temperature comprising forming a core of a material transformable directly to gas into the required shape, coating this shaped core with said finely divided particles, initiating transformation of the core into gas, slowly removing the core material through the particulate coating in gaseous form at a rate insufficient to damage the coating, and consolidating the coating to strengthen the hollow article.

2. The process of claim 1 wherein a binder is used to assist in retaining the hollow shape on removal of the core.

3. The process of claim 1 wherein the time for complete removal of the core is at least about 0.5 hour.

4. The process of claim 2 wherein the binder is a drying oil.

5. The process of claim 4 wherein the drying oil is added or applied to the core material before forming the coating.

6. The process of claim 4 wherein the drying oil is added or applied to the coating before removal of the core.

7. The process of claim 1 wherein the core material is one of naphthalene and paraformaldehyde.

8. The process of claim 1 wherein small hollow spheres are prepared from metal particles by forming the sublimable material into small spheres, coating the spherical cores with the metal particles in amount to give the desired wall thickness, contacting the coating with a binder material, slowly removing the core material through the coating by sublimation, removing the binder, and sintering the metal particles to form rigid hollow metal spheres.

9. The process of claim 8 wherein the core is completely sublimed in from one to 24 hours and the binder progressively sets during this period.

10. The process of claim 8 wherein the metal flake or powder is one of aluminum, magnesium, boron, beryllium, copper, silver and zinc.

11. The process of claim 1 wherein metal coatings are formed by tumbling the cores with thin metal flakes.

12. The process of claim 11 wherein coatings not more than about 0.001 inch thick are formed in the presence of a settable binder.

References Cited

UNITED STATES PATENTS

| | | | |
|---|---|---|---|
| 3,135,044 | 6/1964 | Mote et al. | 29—192 XR |
| 3,264,073 | 8/1966 | Schmitt | 29—182 |
| 3,371,405 | 3/1968 | Klibanoff | 29—183.5 |

L. DEWAYNE RUTLEDGE, Primary Examiner

J. E. LEGRU, Assistant Examiner